United States Patent [19]

Drent et al.

[11] Patent Number: 5,719,258
[45] Date of Patent: Feb. 17, 1998

[54] POLYMER OF AN ACETYLENICALLY UNSATURATED COMPOUND

[75] Inventors: Eit Drent; Dennis Humphrey Louis Pello, both of Badhuisweg, Netherlands

[73] Assignee: Shell Oil Company, Houston, Tex.

[21] Appl. No.: 613,876

[22] Filed: Mar. 11, 1996

[30] Foreign Application Priority Data

Sep. 3, 1995 [EP] European Pat. Off. .............. 95200584

[51] Int. Cl.$^6$ .................................................. C08G 67/02
[52] U.S. Cl. ........................ 528/392; 524/709; 524/745; 502/162
[58] Field of Search ........................ 528/392; 524/709, 524/745; 502/162

[56] References Cited

U.S. PATENT DOCUMENTS

| | | | |
|---|---|---|---|
| 5,175,244 | 12/1992 | Budzelaar et al. | 528/392 |
| 5,434,243 | 7/1995 | Mastenbroek et al. | 528/392 |
| 5,440,010 | 8/1995 | Cheron et al. | 528/392 |

FOREIGN PATENT DOCUMENTS

| | | |
|---|---|---|
| 0336459 | 11/1989 | European Pat. Off. . |
| 0650761 | 3/1995 | European Pat. Off. . |

*Primary Examiner*—Samuel A. Acquah

[57] ABSTRACT

A copolymer of carbon monoxide with an acetylenically unsaturated compound and optionally an olefinically unsaturated compound, on the understanding that the copolymer is not a copolymer of carbon monoxide and exclusively acetylene which contains less than 15%-mole of monomer units originating in carbon monoxide and which is obtainable by copolymerizing the monomers in the presence of a catalyst of titanium tetrabutoxide and triethylaluminium; and a process for copolymerizing an acetylenically unsaturated compound and optionally an olefinically unsaturated compound with carbon monoxide, wherein the monomers are contacted with a catalyst composition based on:

(a) a source of palladium, and
(b) an anionic phosphorus ligand of the general formula $R^1R^2P-R^3-X$, wherein $R^1$ and $R^2$ independently represent optionally polar substituted hydrocarbyl groups, $R^3$ is a bivalent bridging group having 2 carbon atoms in the bridge and X is an anionic group.

13 Claims, No Drawings ized, more preferably at least 99%-mole, of monomer units originating in acetylenically unsaturated compounds. It is most preferred that the copolymer of this invention is a copolymer of exclusively an acetylenically unsaturated compound and carbon monoxide.

POLYMER OF AN ACETYLENICALLY UNSATURATED COMPOUND

FIELD OF THE INVENTION

The present invention relates to polymers of acetylenically unsaturated compounds.

BACKGROUND OF THE INVENTION

Polymers of acetylene and substituted acetylenes have been known for many decades and have attracted attention in view of their electrical conductivity. These polymers possess electrical conductivity by virtue of the presence of unsaturated bonds in their chains which participate in an extended π-electron conjugation.

It has now been found that copolymers of acetylenically unsaturated compounds and carbon monoxide can be prepared by copolymerizing an acetylenically unsaturated compound with carbon monoxide in the presence of a palladium containing catalyst in which the palladium is complexed with an anionic phosphine ligand. Such copolymers may be obtained in a form wherein the polymer chains comprise spiroketal entities, as further explained hereinafter. These spiroketal entities can be converted into enone entities. Enone entities participate in an extended system of π-electron conjugation.

As disclosed in EP-A-280380 and EP-A-632084, the palladium containing catalysts have been used for the preparation of copolymers of carbon monoxide with olefins. It is surprising that other catalysts which are highly active catalysts for the copolymerization of carbon monoxide with olefinically unsaturated compounds are not suitable for the copolymerization of carbon monoxide with acetylenically unsaturated compounds. These other catalysts are based on palladium complexed with neutral diphosphine ligands, such as 1,3-bis(diphenylphosphino)propane, and neutral diamine ligands, such as 2,2'-bipyridine.

It is also possible to include an olefinically unsaturated compound as an additional monomer with polymerizable carbon-carbon unsaturation.

Chien et al. (Macromolecules 1985, 18, 622–627) disclosed the preparation of copolymers of carbon monoxide and acetylene. The copolymerization was effected by using a catalyst of titanium tetrabutoxide and triethylaluminium. The authors have stated that the maximum attainable incorporation of carbon monoxide in the copolymers is about 13%-mole.

SUMMARY OF THE INVENTION

The present invention relates to a copolymer of carbon monoxide with an acetylenically unsaturated compound and optionally an olefinically unsaturated compound. The copolymer is not a copolymer of carbon monoxide and exclusively acetylene which contains less than 15%-mole of monomer units originating in carbon monoxide and which is obtainable by copolymerizing the monomers in the presence of a catalyst of titanium tetrabutoxide and triethylaluminium.

The invention further relates to a process for copolymerizing an acetylenically unsaturated compound and optionally an olefinically unsaturated compound with carbon monoxide, wherein the monomers are contacted with a catalyst composition based on (a) a source of palladium, and (b) an anionic phosphorus ligand of the general formula $R^1R^2P$-$R^3$-X, wherein $R^1$ and $R^2$ independently represent optionally polar substituted hydrocarbyl groups, $R^3$ is a bivalent bridging group having 2 carbon atoms in the bridge and X is an anionic group.

DETAILED DESCRIPTION OF THE INVENTION

The acetylenically unsaturated compounds useful in this invention contain typically up to 20 carbon atoms, more typically up to 10 carbon atoms. They may vary widely in structure, in that they may consist of carbon and hydrogen or they may contain also heteroatoms, for example such as in ethynylferrocene, 2-, 3- and 4-ethynylpyridine, propargylic acid, propargylic acid esters, such as the methyl and ethyl ester, and propargylic acid amides, such propargylic acid amide. The acetylenically unsaturated compounds have suitably at most one organic group attached to the ethynyl group. Preferably the acetylenically unsaturated compound is of the general formula R-C°CH wherein R denotes a hydrogen atom or a hydrocarbyl group. Hydrocarbyl groups R may suitably be aryl groups, such as phenyl, 4-methoxyphenyl, 3-chlorophenyl and naphthyl groups, or (cyclo)alkyl groups, such as methyl, ethyl, 2-propyl, 2-hexyl, cyclohexyl and 2-methylhexyl-1 groups. The group R is in particular a methyl group, in which case the acetylenically unsaturated compound is propyne, or more in particular hydrogen, in which case the acetylenically unsaturated compound is acetylene or ethane. A mixture of acetylenically unsaturated compounds may be involved, such as a mixture of acetylene and propane, but a single acetylenically unsaturated compound is preferred.

As indicated above, olefinically unsaturated compounds may be incorporated into the copolymers of this invention as an additional monomer. It is, however, preferred to incorporate substantially only acetylenically unsaturated compounds as the monomers with polymerizable carbon-carbon unsaturation, because this can lead to copolymers with more extended p-electron conjugation. In this respect it is preferred that in the copolymers the monomer units originating in the monomers with polymerizable carbon-carbon unsaturation constitute for at least 90%-mole, more preferably at least 99%-mole, of monomer units originating in acetylenically unsaturated compounds. It is most preferred that the copolymer of this invention is a copolymer of exclusively an acetylenically unsaturated compound and carbon monoxide.

In another embodiment of this invention it is preferred to incorporate in the copolymers a relatively large quantity of the olefinically unsaturated compound, so that they can be considered as being copolymers of carbon monoxide and an olefinically unsaturated compound which are modified by the incorporation therein of an acetylenically unsaturated compound. Copolymers of carbon monoxide and an olefinically unsaturated compound are frequently used as engineering thermoplastic. The modification by incorporation therein of an acetylenically unsaturated compound may serve to modify or improve one or more of the copolymer's properties, for example, the glass transition temperatures. They may also be modified further by chemical derivatization reactions which involve conversion of the carbon-carbon unsaturation present in the monomer units originating in the acetylenically unsaturated compound, such as by chlorination, hydrogenation and hydration. In this embodiment of the invention it is preferred to prepare copolymers in which the monomer units originating in the monomers with polymerizable carbon-carbon unsaturation constitute for at most 50% mole, more preferably 2–25% mole, of monomer units originating in an acetylenically unsaturated compound.

The olefinically unsaturated compounds contain typically up to 20 carbon atoms, more in particular up to 10 carbon atoms. They may contain heteroatoms, such as in methyl acrylate, vinyl acetate and N-vinylpyrrolidone. It is however preferred that the olefinically unsaturated compounds are hydrocarbons. Aromatic mono-olefins such as styrene may be incorporated. A preferred class of olefinically unsaturated hydrocarbons are aliphatic mono-olefins, in particular a-olefins of which ethane, propane, 1-butane or mixtures thereof are useful representatives. Of these, ethane is particularly preferred.

The molecular weight of the copolymer of this invention is not critical and may be chosen according to the requirements associated with the envisaged application of the polymer, for example the tensile strength and the impact strength requirements. The number average molecular weight is suitably in the range of from 300–1,000,000, preferably in the range of from 500 to 100,000, most preferably in the range of from 1000 to 50,000.

The linearity of the copolymer chains and the number of monomer units originating in the monomers with polymerizable carbon-carbon unsaturation relative to the number of carbon atoms originating in carbon monoxide will both, at least in part, determine the regularity of the polymer chains and thereby also some of the properties of the copolymer, for example the attainable crystallinity. The ratio of the number of monomer units originating in the acetylenically unsaturated compound and, if present, the olefinically unsaturated compound and the number of carbon atoms originating in carbon monoxide is suitably at most 6:1, preferably in the range of from 1:1–2:1, more preferably from 1:1–1.2:1. The copolymer is preferably linear. In particular the copolymer is a linear alternating copolymer. The term alternating implies that the said ratio equals unity and that in the copolymer chains the monomer units originating in the monomers with polymerizable carbon-carbon unsaturation alternate with the carbon atoms originating in carbon monoxide.

The copolymers of this invention may be prepared by contacting the monomers with a catalyst composition based on:

(a) a source of palladium, and (b) an anionic phosphorus ligand of the general formula $R^1R^2P-R^3-X$, wherein $R^1$ and $R^2$ independently represent optionally polar substituted hydrocarbyl groups, $R^3$ is a bivalent bridging group having 2 carbon atoms in the bridge and X is an anionic group.

The copolymer prepared according to this process can have polymer chains which comprise or consist of entities having a spiroketal type structure. Taking as an example an alternating copolymer of carbon monoxide and acetylene, this structure may be illustrated by the following general formula

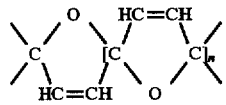 (I)

wherein n is an integer.

This is a surprising result because at first glance one would expect that copolymerizing carbon monoxide with acetylene would yield a copolymer having chains with enone entities which participate in an extended p-electron conjugation. Taking again as an example an alternating copolymer of carbon monoxide and acetylene, such a structure may be illustrated by the following general formula:

 (II)

wherein m is an integer.

Not wishing to be bound by any theory it is believed that this difference in structure will contribute to an better thermal and oxidative stability of the copolymers of structure (I), relative to those of structure (II). This improvement results from the presence in the spiroketal entities of structure (I) of isolated, i.e. non-conjugated, double bonds which do not have allylic hydrogen atoms attached to the polymer chain, which spiroketal entities replace enone entities which participate in a chemically labile system of conjugated double bonds. Further, the double bonds in the spiroketal entities do not have intrinsically labile allylic hydrogen atoms attached to the polymer chain.

The source of palladium may be palladium as such or a palladium compound, suitably a palladium salt. Examples of useful palladium salts are palladium salts of a carboxylic acid. Palladium acetate is preferred.

The anionic phosphorus ligand of the general formula $R^1R^2P-R^3-X$ as defined hereinbefore is typically derivable from an acid having a pKa of less than 4, preferably less than 2, when measured in water at 18° C. Suitable anionic groups X of the phosphorus ligand are derivable from organic acids, such as sulphonic acids and carboxylic acids. The anionic group derivable from sulphonic acid is preferred, so that the anionic group X of the general formula described hereinbefore is preferably a sulphonate group ($—SO_3—$).

The groups R1 and R2 may be the same or different and they represent aliphatic or aromatic hydrocarbyl groups typically having up to 10 carbon atoms, such as e.g. alkyl, cycloalkyl, alkenyl, aryl, arylalkyl, alkylaryl or functionalized derivatives thereof. Also useful are polar substituted hydrocarbyl groups. The polar substituents may be, e.g. alkoxy groups typically having up to 6 carbon atoms, of which methoxy is a particularly suitable representative. It is preferred that R1 and R2 are the same, while in a most preferred embodiment of the present invention R1 and R2 both represent a phenyl group.

The bridging group R3 may be any bivalent group having two carbon atoms in the bridge. The bridging group R3 contains typically up to 10 carbon atoms. Preferably it is a bivalent aromatic or aliphatic hydrocarbyl group, for example, 1,2-ethylene, 1,2-propylene, 1,2-butylene, 2,3-butylene, 1,2-phenylene or 1-phenyl-1,2-ethylene. The bridging group may contain heteroatoms, such as silicon, halogens or oxygen. Preferred bridging groups are unsubstituted 1,2-ethylene and 1,2-phenylene groups.

The anionic phosphorus ligand is suitably incorporated in the form of an acid or as a salt, an acid being preferred.

In a particularly preferred embodiment of the present process the phosphorus ligand used as component (b) of the catalyst composition is derived from 2-(diphenylphosphino) benzenesulphonic acid, which is an acid having a pKa of less than 2.

The process of the present invention may be carried out in the gaseous phase or in a liquid diluent, the last option being preferred. Suitable liquid diluents may be protic or aprotic diluents or mixtures thereof. Accordingly, useful protic diluents include alcohols, in particular lower alcohols, such as methanol and ethanol, while acetone, tetrahydrofuran and diglyme (bis(2-methoxyethyl)ether) are examples of useful aprotic diluents. The use of alcohols as diluent may result in addition of alcohol species to some of the double bonds in the spiroketal entities and in the formation of ester end-groups. End-groups associated with spiroketal entities are typically lactones.

If a palladium salt such as palladium acetate is used as the source of palladium, an additional organic acid having a pKa of less than 4 may be present as well for optimizing the catalytic activity of the catalyst composition. Such acid may be helpful in removing the acetate groups from the palladium atom, which have not been replaced by the anionic phosphorus ligand, so that the number of available catalytically active palladium sites can be increased. Particularly suitable for this purpose is a sulphonic acid, such as e.g. methanesulphonic acid, but other organic acids having a pKa of less than 4 may be used as well.

The amount of catalyst composition to be used in the process according to the present invention is not particularly critical and may vary within wide limits. Suitably, the amount of catalyst composition used is such that it contains in the range of from $10^{-7}$ to $10^{-2}$, and in particular $10^{-6}$ to $10^{-3}$, gram atom palladium per mole of acetylenically unsaturated compound and olefinically unsaturated compound, if any, to be polymerized.

The molar ratio of the monomers present in the polymerization mixture may vary between wide limits. Typically the molar ratio of carbon monoxide to the acetylenically unsaturated compound and olefinically unsaturated compound, if any, is 1:1–100:1, preferably 5:1–50:1.

The process of the invention is preferably conducted at a temperature in the range of from 20° to 200° C., more preferably 30° to 150° C., while the pressure is preferably in the range of from 1 to 200 bar, more preferably 5 to 100 bar.

The copolymers of this invention may be recovered from the polymerization mixture using conventional methods, for example by filtration or by evaporation of the diluent. They may be brought into the desired shape by the usual forming techniques, such as cold or hot pressing. Alternatively the polymerization is carried out in such a way that the copolymer is formed in the desired shape, such as by solution polymerization in a thin layer and subsequent removal of the diluent, which yields the copolymer in the form of a film.

The copolymers of this invention may be useful, as such or after suitable derivatization, in applications where electrical conductivity is an important property. Such derivatization may include methods by which a spiroketal structure is converted into a corresponding enone structure so that the copolymer chains have an extended p-electron conjugation. This may be effected, for example, by treating the copolymer with aqueous acid. Typically an assembly of 5 or more, preferably 7 or more, monomer units originating in the acetylenically unsaturated compounds contribute to a system of extended π-electron conjugation.

The derivatization methods may also include the doping with additives such as those with which the conductivity of conventional polyacetylenes can be enhanced, for example arsene pentafluoride and iodine. The conductivity enhancing additives may also be suitable for effecting the conversion of a spiroketal structure into the corresponding enone structure.

Accordingly, the present invention also relates to a copolymer composition comprising a copolymer according to this invention with an extended p-electron conjugation and a conductivity enhancing additive.

Suitable quantities of conductivity enhancing additives am 0.10–3 parts by weight per part by weight of the copolymer.

The invention is further illustrated by the following examples without restricting the invention to these specific embodiments.

EXAMPLE 1

A magnetically stirred autoclave having a capacity of 250 ml was charged with a catalyst solution comprising:
50 ml of methanol,
0.1 mmole of palladium acetate, and
0.12 mmole of 2-(diphenylphosphino)benzenesulphonic acid.

Air was removed from the autoclave by evacuation, after which acetylene was introduced until a pressure of 1.4 bar was reached. No higher pressure was used for reasons of safety. Subsequently, carbon monoxide was introduced until a pressure of 30 bar was reached. The autoclave was heated to 110° C. and polymerization was allowed to proceed for 5 hours, after which it was terminated by cooling to room temperature followed by releasing the pressure. The polymeric product thus obtained was filtered off, washed with methanol and dried in vacuo at room temperature.

2.5 gram of polymer was obtained.

Analysis by Magic Angle Spinning-13C NMR showed the following major signals (an assignment in brackets): 129 ppm (—CH═CH—, i.e. vinyl group in spiroketal structure), 45 ppm (C—CH—O—, i.e. formed upon addition of methanol to vinyl groups in spiroketal structure) and 52 ppm (CH3—O—, i.e. end-groups, and groups formed upon addition of methanol to vinyl groups in spiroketal structure); weaker signals: 205 ppm (carbonyl groups), 170 ppm and 175 ppm (estercarbonyl end-groups, lactone carbonyl end groups) and 80 ppm (spiro carbon atoms). The NMR spectrum was consistent with a linear structure of the polymer chains and with a quantity of carbon monoxide incorporated of about 40 mole-%, calculated on the total of carbon monoxide and acetylene. Infra-red absorptions (KBr tablet) were found at 1724 $cm^{-1}$ (strong, sharp), 900–1400 $cm^{-1}$ (broad) and 2950 $cm^{-1}$ (intermediate, sharp).

COMPARATIVE EXAMPLE A

The procedure of Example 1 was repeated except that 0.12 mmole 1,3-bis(diphenylphosphino)propane and 2 mmole trifluoroacetic acid were used instead of 2-(diphenylphosphino)benzenesulphonic acid.

No polymer was formed.

COMPARATIVE EXAMPLE B

The procedure of Example 1 was repeated except that 0.5 mmole bipyridine and 0.2 mmole methanesulphonic acid were used instead of 2-(diphenylphosphino) benzenesulphonic acid.

No polymer was formed.

We claim:

1. A copolymer produced according to a process comprising reacting carbon monoxide with an acetylencially unsaturated monomer in the presence of a catalyst with the proviso that said catalyst does not comprise titanium tetrabutoxide or triethylaluminum; and further that the copolymer is not a copolymer consisting exclusively of acetylene and carbon monoxide wherein the mole percent of carbon monoxide is less than 15%.

2. A copolymer as claimed in claim 1 wherein said acetylenically unsaturated monomer is of the formula R C CH wherein R is a hydrogen atom or a hydrocarbyl group.

3. A copolymer as claimed in claim 1 wherein said monomer is acetylene.

4. A copolymer as claimed in claim 1 further comprising an alpha olefin.

5. A copolymer as claimed in claim 1 having a number average molecular weight of about 500 to about 100,000.

6. A linear copolymer as claimed in claim 4 wherein the ratio of monomer units comprising acetylenically unsaturated monomer to monomer units of alpha olefin are from about 1:1 to 2:1.

7. A copolymer produced according to a process consisting of reacting carbon monoxide with an acetyiencially unsaturated monomer in the presence of a catalyst with the proviso that said catalyst does not comprise titanium tetrabutoxide or triethylaluminum; and further that the copolymer is not a copolymer consisting exclusively of acetylene and carbon monoxide wherein the mole percent of carbon monoxide is less than 15%.

8. The copolymer of claim 1 wherein said catalyst comprises:

(a) a source of palladium, and (b) an anionic phosphorous ligand of the general formula $R^1R^2P-R^3-X$, wherein $R^1$ and $R^2$ independently represent optionally polar substituted hydrocarbyl groups, $R^3$ is a bivalent bridging group having 2 carbon atoms in the bridge and X is an anionic group.

9. The copolymer of claim 1 having an extended π-electron conjugation.

10. The copolymer of claim 9 further comprising a conductivity enhancing additive.

11. A process for producing copolymer comprising reacting carbon monoxide with an acetylencially unsaturated monomer in the presence of a catalyst wherein said catalyst comprises:

(a) a source of palladium, and (b) an anionic phosphorous ligand of the general formula $R^1R^2P-R^3-X$, wherein $R^1$ and $R^2$ independently represent optionally polar substituted hydrocarbyl groups, $R^3$ is a bivalent bridging group having 2 carbon atoms in the bridge and X is an anionic group.

12. A process as claimed in claim 11 wherein said anionic ligand is obtained from an acid having a pKa of less than 4.

13. A process as claimed in claim 11 wherein both $R^1$ and $R^2$ represent phenyl groups, $R^3$ is a selected from the group consisting of 1,2-ethylene and 1,2-phenylene and X is a sulphonate group.

* * * * *